Patented Aug. 23, 1938

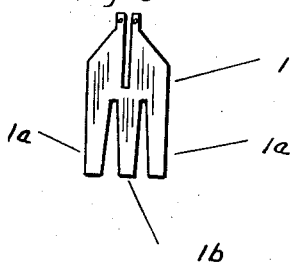
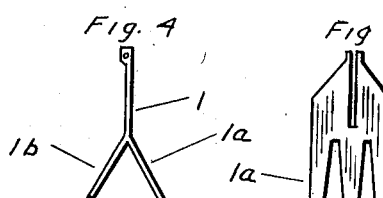
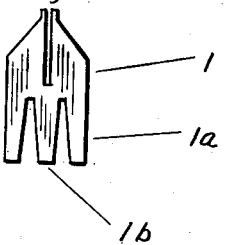
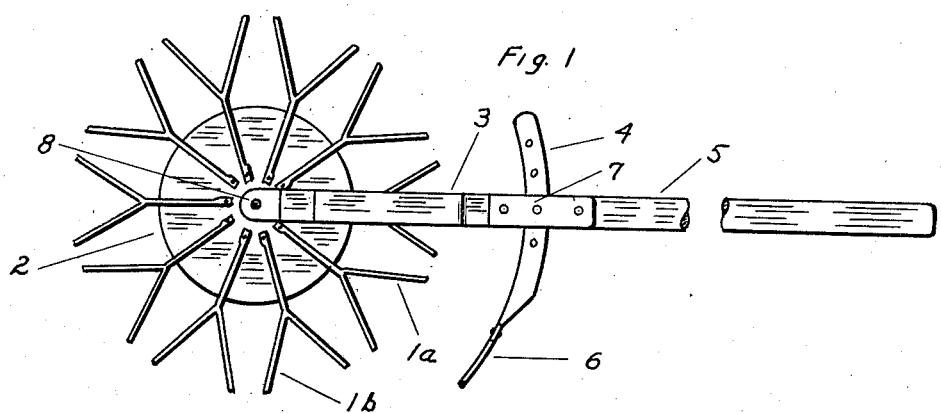
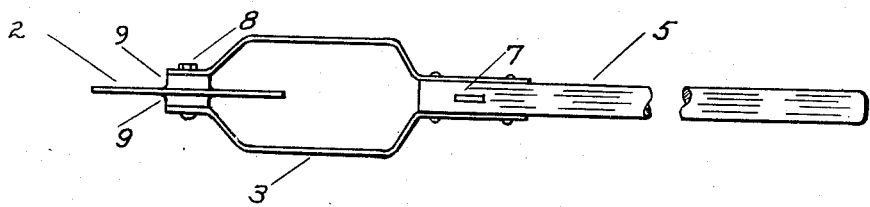

2,128,077

UNITED STATES PATENT OFFICE 2,128,077

ROTARY CULTIVATOR

Clemm T. Custer, Martinsburg, W. Va.

Application October 15, 1936, Serial No. 105,785

4 Claims. (Cl. 97—52)

This invention relates to soil pulverizers and its object is to provide a moving frame with a series of soil cutting blades carried by radial arms on a rotating disc on a shaft at the forward end of said frame to penetrate and mulch the soil that is further treated by a plow or cultivator.

The frame may be operated by hand and the radial arms and blades afford a ready means as a wheel to move the device over the ground and for the operation of the cultivator, all to thoroughly pulverize and mulch the ground.

These and other objects and details of the invention are more fully described in the following specification, set forth in the appended claims and illustrated in the accompanying drawing, wherein:

Figure 1 is a side elevation of the invention.

Fig. 2 is a plan view of the same.

Figs. 3, 4 and 5 are detail views of the cutter blades.

Fig. 6 is a face view of the fork or cultivator.

The frame of the pulverizer consists of the beam 5 acting as a handle at its right hand end and at its left hand or forward end having a bracket consisting of strap steel sections 3 through which passes a bolt 8 that is the shaft for a rotating disc 2 on a hub 9. A cultivator fork 6 at the end of a bar 4 that may be adjusted in the handle through a slot 7 by means of a bolt 7' so as to regulate its depth in the soil.

Arranged around the periphery of the disc 2 are a plurality of cutting blades 10 comprising fingers 11, alternating at different angles and likewise following each other. Each blade is slotted as at 13 to straddle the disc and be secured thereto by bolts or rivets through the perforated ears 12 and as the pulverizer is pushed forward the disc 2 and the cutters rotate and the fingers penetrate and loosen the soil that may also be dug and mulched by the fork 6.

The raising or lowering of the handle will regulate the penetrating power of the cutter blades and their staggered action will loosen the soil over quite an area as the pulverizer is pushed forward. The action of the cutter blades is assured by the weight of the device and they are thereby forced through the clods and the soil, cutting up the same instead of merely pushing them into the soil.

It is obvious that the parts and details of the device may be otherwise arranged or modified without departing from the essential features above described or from the scope of the appended claims.

What I claim as new is:

1. In a cultivating implement, the combination of a handle beam having a forwardly extending forked bracket, a circular rotating disk journalled in said bracket, transverse cutting blades slotted to straddle said disk and to be secured thereto, each cutting blade comprising a portion extending to either side of a radial position, and a cultivator blade adjustable in the handle beam to a position to assist the rotating tool in lifting surface soil and weeds.

2. In a cultivating implement, the combination of a handle beam having a forwardly extending forked bracket, a circular rotating disk journalled in said bracket, transverse cutting blades slotted to straddle said disk and to be secured thereto, each cutting blade comprising portions thereof extending at such an angle to both sides of a radial position as will provide maximum penetration of the surface soil with minimum resistance, and a cultivator blade adjustable to the handle beam so as to determine the depth of penetration of the surface soil by the rotating tool and to a position to otherwise assist the rotating tool in penetrating and lifting surface soil and weeds.

3. In a cultivating implement, the combination of a handle beam having a forwardly extending forked bracket, a circular rotating disk journalled in said bracket, transverse cutting blades fixed to said disk, each cutting blade comprising a portion extending to either side of a radial position, and a cultivator blade adjustable in the handle beam to a position to assist the rotating tool in lifting surface soil and weeds.

4. In a cultivating implement, the combination of a handle beam having a forwardly extending forked bracket, a circular rotating disk journalled in said bracket, transverse cutting blades fixed to said disk, each cutting blade comprising portions thereof extending at such an angle to both sides of a radial position as will provide maximum penetration of the surface soil with minimum resistance, and a cultivator blade adjustable in the handle beam so as to determine the depth of penetration of the surface soil by the rotating tool and to a position to otherwise assist the rotating tool in penetrating and lifting surface soil and weeds.

CLEMM T. CUSTER.